J. L. KIVLAN.
JAR LIFTER.
APPLICATION FILED JAN. 15, 1920.
1,360,227.
Patented Nov. 23, 1920.
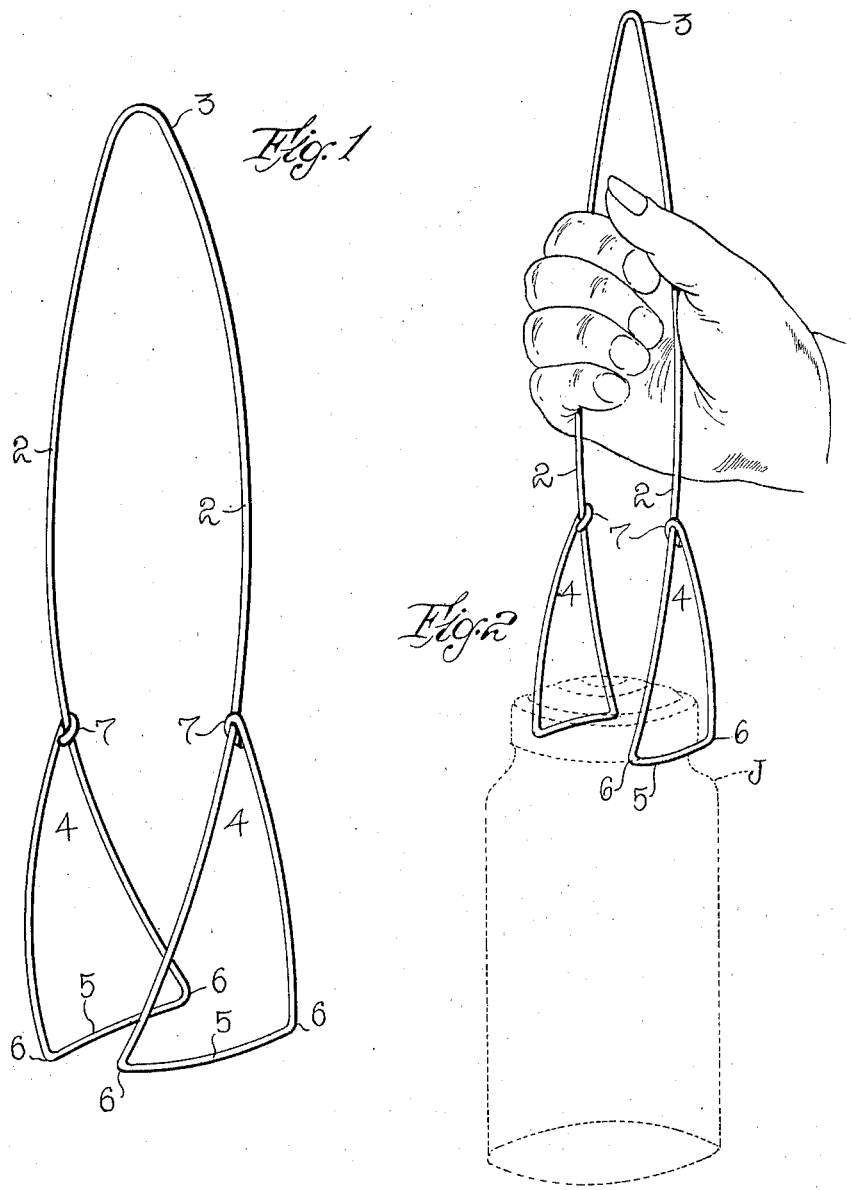

UNITED STATES PATENT OFFICE.

JOHN L. KIVLAN, OF BOSTON, MASSACHUSETTS.

JAR-LIFTER.

1,360,227.　　　　Specification of Letters Patent.　　Patented Nov. 23, 1920.

Application filed January 15, 1920. Serial No. 351,739.

*To all whom it may concern:*

Be it known that I, JOHN L. KIVLAN, a citizen of the United States, residing at Boston, in the county of Suffolk and State of Massachusetts, have invented certain new and useful Improvements in Jar-Lifters; and I do hereby declare the following to be a full, clear, and exact description of the invention, such as will enable others skilled in the art to which it appertains to make and use the same.

This invention relates to culinary implements and particularly to the devices for facilitating the handling of containers while they are being subjected to a heating process or while they are in a heated condition.

It is one of the important objects of the present invention to provide a simple, practicable, durable, substantial and readily applied device whereby containers such, for instance, as glass jars or cans may be handled while the contents thereto are being subjected to a cooking process. It is another object of the invention to provide a device of this type which may readily be applied to containers or jars of various shapes, sizes and proportions and effectually grip the same and at the same time to provide a device of this kind which will not become sufficiently heated to be uncomfortable in the handling.

With these and other objects in view as will be rendered manifest to those skilled in the art, the invention consists of the construction, the combination and in details and arrangements of the elements as will be more particularly described in the following specification relative to the embodiment of the invention shown in the accompanying drawing, in which:

Figure 1 is a perspective of the device.

Fig. 2 is a perspective showing the lifter as applied to one type of jar.

In the form of my invention shown, the lifter is made of an integral piece of wire of suitable size and length and a pair of arms 2—2 bent in a common plane and connected at the bow 3. The lower or yielding ends of the arms are shown as provided with a pair of gripping loops formed by diverting the lower end of each arm as at 4—4 and then bending the same transversely as at 5—5 and then, at the end of each transverse bar, turning the ends as at 6—6, the wire being bent over to form hooks 7—7 which clench the inclosed body of the wire. The shanks of the arms 2—2 are made of sufficient length to enable the gripping loops to be extended down into the vessel of boiling water, so that the hand of the operator will not be brought into the close proximity of the heated water and at the same time by pressure of the hand the jaw or gripping loops can be brought together to embrace the upper portion of the jar-body J, Fig. 2. The cross bars 5—5 of the gripping device are designed to be positioned beneath suitable circumferential projections or shoulders on opposite sides of the jar J, and therefore while the jaws are held close they can be lifted readily from the boiler.

From the above it will be seen that I have provided a device of this character which not only is extremely simple and inexpensive but, also, is adapted to be applicable to jars or cans of various shapes and sizes and may be utilized in the removal and handling of these jars while in a heated condition, without danger to the operator of being burnt and also the device being entirely free of connections with any other parts can be freely moved from jar to jar and kept handy for use.

What I desire to claim is:

A jar lifter comprising a wire bent into substantially U form having bowed arms with triangular stirrups formed at the ends of said arms, said stirrups comprising end members substantially parallel to each other and perpendicular to the arms, and side members converging from the ends of said end members to the arms, said side members of the stirrups conforming to the bow of the arms.

In testimony whereof I affix my signature.

JOHN L. KIVLAN.